United States Patent Office 3,022,303
Patented Feb. 20, 1962

3,022,303
HALOMETHYL-S-TRIAZINES
Christoph J. Grundmann and Ehrenfried Kober, Columbus, Ohio, assignors to Olin Mathieson Chemical Corporation, a corporation of Virginia
No Drawing. Filed Aug. 1, 1956, Ser. No. 601,342
8 Claims. (Cl. 260—248)

Our invention relates to novel dihalomethyl-1,3,5-triazines which are useful as intermediates, allergenics and vesicants. They have the formula:

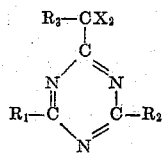

wherein X is a halogen, $R_1$ is hydrogen, a halogen, a hydroxy group, an alkyl group, an aryl group, an alkoxy group, an aryloxy group, a thioalkyl group, a thioaryl group, an amino group, a monoalkylamino group, a monoarylamino group, a dialkylamino group, a diarylamino group or an aziridino group; $R_2$ is a halogen, a hydroxy group, an alkoxy group, an aryloxy group, a thioalkyl group, a thioaryl group, an amino group, a monoalkylamino group, a monoarylamino group, a dialkylamino group, a diarylamino group, an aziridino group or a

group; $R_3$ is hydrogen, an alkyl group, an aryl group, a carbalkoxy group, or an aliphatic alkyl group substituted by

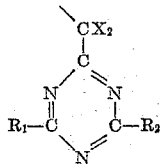

wherein $R_1$ and $R_2$ have the meanings described above. The alkyl and aryl groups contain not more than 8 carbon atoms. The useful alkyl groups in the various substituents include, for example, methyl, ethyl, propyl, butyl, amyl, hexyl, heptyl and octyl. The useful aryl groups include, for example, phenyl, tolyl and xylyl. Useful halogens include chlorine, bromine and iodine.

We have found that the dihalo compounds (except the compounds in which $R_1$ or $R_2$ is a hydroxy group) can be efficiently prepared by treating diazomethyl triazines of the following formula (in which $R_1$, $R_2$ and $R_3$ have the same meanings as above except that neither $R_1$ nor $R_2$ is a hydroxy group, the

group of $R_2$ is a

group and the

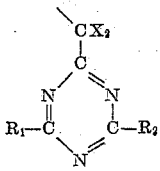

group of $R_3$ is a

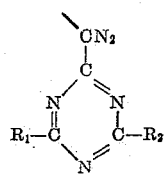

group) with a halogen (X), viz:

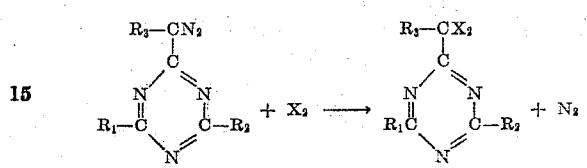

The reaction of the substituted diazomethyl-s-triazines defined above with the halogen is preferably carried out in a solvent or diluent, which is not attacked by the halogen and on the other hand does not react itself with the diazo group of the s-triazine derivative. Suitable solvents are, for example, diethylether, methylene chloride, chloroform, carbontetrachloride, tetrahydrofurane, dioxane. The reaction is usually carried out at room temperature. It can be completed by heating the reaction mixture to reflux for some time. The reaction proceeds with the stoichiometrical amount of halogen, but an excess of halogen is not deleterious except in these cases where it may cause an undesired reaction with the substituents $R_1$, $R_2$ and $R_3$. The formed substituted dihalomethyl-s-triazines are isolated from the reaction mixture after removing the solvent and, eventually, an excess of the halogen by distillation or crystallization.

A hydroxyl group on the triazine nucleus is sufficiently acidic to destroy the diazo group; therefore, the above method using diazomethyl triazines cannot be used to prepare 2-dihalomethyl-4 and/or 6-hydroxy-1,3,5-triazines. The latter compounds can be readily prepared, however, by treating the novel 2-dihalomethyl-4 and/or 6-halo-1,3,5-triazines with an alkali, e.g. dilute sodium carbonate or hydroxide. By the term alkali we mean the alkali metal hydroxides and carbonates. Under mild reaction conditions, the relatively stable dihalomethyl group is substantially unaffected and the hydroxy compound is readily obtained.

The diazomethyl compounds from which the novel compounds of this invention are prepared are described and claimed in our copending application Serial No. 601,343, filed August 1, 1956. They are obtained by reacting halogeno-1,3,5-triazines containing at least two halogen atoms directly connected with the triazine nucleus with diazo compounds which have at least one hydrogen atom available at the carbon atom which bears the diazo group. The reaction is expressed by the following general equation, wherein $R_1$ and $R_3$ have the meanings described above for the diazomethyl triazines and X is a halogen:

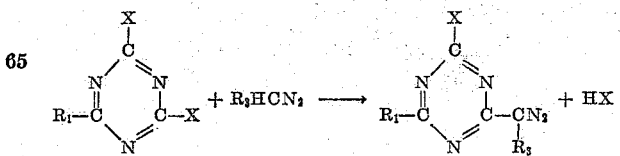

Using an excess of the diazo compound, i.e. at least 2 moles of diazo compound per mole of triazine, under suitable conditions, the second halogen atom can react according to the equation:

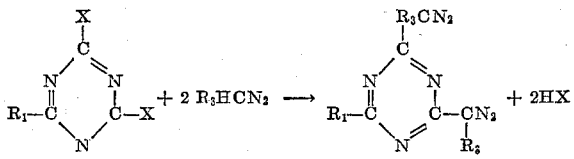

These bis-diazo-substituted triazines are generally unstable and therefore difficult to obtain in pure form.

The useful halogeno-1,3,5-triazines include, for example, the known cyanuric trihalides, especially cyanuric chloride. Other suitable starting materials are 2-methyl-4,6-dichloro-1,3,5-triazine, 2-phenyl-4,6-dichloro-1,3,5-triazine, 2,4-dichloro-1,3,5-triazine, and 2-amino-4,6-dichloro-1,3,5-triazine.

The useful diazo compounds are those which have at least one hydrogen atom available at the carbon atom which bears the diazo group. Thus, lower aliphatic diazo compounds, e.g., diazomethane, diazoethane, diazopropane, in general are suitable. Also bifunctional aliphatic diazo compounds like 1,6-diazo-hexane can be used. Diazoaralkyl compounds such as diazotoluene are useful. Diazocarbalkoxy compounds such as diazoacetic acid ester, e.g., methyl or ethyl diazoacetate, are useful.

The reaction to produce the diazomethyl compounds is usually carried out in homogeneous phase in a solvent inert both to the halotriazine and the diazo compound. Such solvents are, for example, organic liquids such as ethers, e.g., diethylether and dioxane; aliphatic hydrocarbons, e.g., pentane, hexane, heptane; and aromatic and hydroaromatic hydrocarbons, e.g., benzene, toluene or the xylenes, tetralin and decalin.

The reaction is carried out by simply admixing the reactants. In many cases the reaction occurs spontaneously at room temperature or even below, when mixing the components dissolved in a suitable solvent. Sometimes it is preferable to heat the reaction mixture to a temperature below the spontaneous decomposition temperature of the diazo compound. In general, the upper limit of heating is around 130 to 140° C., while the preferred range of heating is between 0° and 80° C. If the diazo compound should be too volatile at elevated temperature, elevated pressure can be used.

The reactants are preferably used in stoichiometric proportions depending on the product desired, i.e., one mole of diazo compound per mole of triazine to form the monodiazotriazine or two moles of diazo compound per mole of triazine to form the bisdiazotriazine, although more or less can be used. As shown by the general equations above during the reaction one or two moles of the corresponding hydrohalogen acid will be generated. Usually these acids will be destroyed by an excess of the diazo compound used according to the known reaction:

$$HX + R_3HCN_2 \rightarrow N_2 + X-H_2C-R_3$$

If it is desired to avoid any loss of the diazo compound by this side reaction, a strong tertiary organic base can be added to the reaction mixture to bind the formed hydrohalogen acid as a salt. Suitable bases for this purpose, are, e.g., triethylamine and tributylamine.

The diazomethyl compounds in which $R_2$ is other than a halogen or a

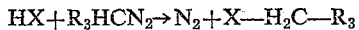

group, i.e. compounds in which $R_1$ and/or $R_2$ are alkoxy, aryloxy, thioalkyl, thioaryl, amino, monoalkylamino, monoarylamino, dialkylamino, diarylamino or aziridino, can be prepared by reacting compounds in which $R_1$ and/or $R_2$ are halogen with alkali metal alkoxides, alkali phenolates, alkali mercaptides, alkali-thiophenolates, ammonia, primary and/or secondary alkyl or aryl amines. For example, 2-diazomethyl-4,6-dihalo-1,3,5-triazine can be reacted with a metal alcoholate as by the following equation:

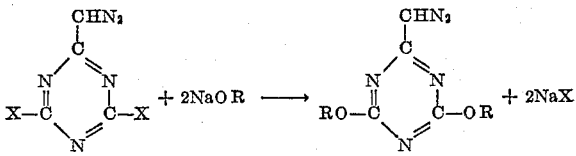

The reaction with the alkali metal alcoholate, for example, sodium methylate or ethylate, is accomplished by slowly adding an alcoholic solution of the triazine to an alcoholic solution of the alkali metal. The particular alcohol used as the solvent is of course that which corresponds to the alcoholate desired as a reactant. The reaction mixture should then stand for about one day at room temperature, after which a short (one-half to one hour) refluxing period is advantageous. The reaction mixture is then filtered to remove the salt and the 2-diazomethyl-4,6-dialkoxy or diaryloxy-1,3,5-triazine is recovered by distilling off the remaining alcohol. Purification of the product can be accomplished by extraction with a suitable solvent, such as the Skellysolves, a group of solvents consisting of hexanes, heptanes, octanes and solvent naphthas. The crystals obtained can then be sublimed in vacuo.

The preparation of the diazo compounds useful in preparing the compounds of our invention will be illustrated by reference to the following examples:

EXAMPLE I

*2-diazomethyl-4,6-dichloro-1,3,5-triazine*

44.3 grams of cyanuric chloride was dissolved in 800 ml. of ether. The solution was slowly added at 0° C. upon stirring to a solution of 0.5–0.6 mole (approximately 23 grams) of diazomethane dissolved in 1000 ml. of ether. The same effect will be obtained if the diazomethane solution is added to the cyanuric chloride solution under the above conditions. The reaction mixture was allowed to stand for about two days at room temperature and then filtered to remove small amounts of solid by-products. The ether was removed from the filtrate by distillation, at room temperature, under a slight vacuum. The resulting residue was extracted three times with 800, 500 and finally 300 ml. of hot Skellysolve C. After maintaining the extracts at a temperature of −25° C. for 2 days, yellow starlets crystallized in a yield of 39.7 grams or 87.5%, M.P. 110–111° C. This product is sufficiently pure for most purposes. For final purification these crystals were sublimed, preferably in small portions under atmospheric pressure at 100–125° C. yielding faint yellow long thin needles which melted at 111.5–112.5° C.

|  | Percent C | Percent H | Percent N | Percent Cl |
| --- | --- | --- | --- | --- |
| Calculated for $C_4HN_5Cl_2$ | 25.29 | 0.53 | 36.86 | 37.32 |
| Found | 25.33 | 0.59 | 36.70 | 37.01 |

EXAMPLE II

*2,4-bis-diazomethyl-6-chloro-1,3,5-triazine*

Cyanuric chloride, 14.6 grams, was dissolved in 500 ml. of dry ether. The solution was slowly added with stirring to a solution of 23 grams of diazomethane in 1000 ml. of ether kept at 0° C.

The reaction mixture was allowed to stand for seven days at room temperature and then filtered to remove small amounts of solid by-products. The ether was removed from the filtrate, at room temperature by applying a slight vacuum. The resulting crystal slurry was extracted once with hot Skellysolve B. After the extract was allowed to stand for four days at −25° C., 0.8 gram of yellow crystals precipitated. After recrystallization from Skellysolve C, the crystals decomposed in an interval from 92–120° C. These crystals are a mixture of approximately 50% of the mono-diazo compound (I) of Example I and 50% of the bis-diazo compound (II) which can be separated by fractional crystallization from ether at low temperatures, if desired. However, this operation is connected with a considerable loss of material owing to its instability and reactivity.

|  | Percent C | Percent H | Percent N | Percent Cl |
|---|---|---|---|---|
| Found | 28.71 / 28.92 | 1.55 / 1.80 | 42.63 / 42.81 | 26.42 / 26.68 |
| Calcd. for 50% I + 50% II | 28.00 | 0.78 | 43.50 | 27.72 |

EXAMPLE III

*2-diazomethyl-4-methyl-6-chloro-1,3,5-triazine*

The amount of 24.6 grams of 2-methyl-4,6-dichloro-1,3,5-triazine was dissolved in 700 ml. of dry ether and slowly added upon stirring to the solution of 14 grams of diazomethane in 600 ml. of dry ether at 0° C. The reaction mixture was allowed to stand for about two days at room temperature and then filtered to remove small amounts of solid by-products. The ether and excess diazomethane were removed from the filtrate by distillation and the resulting residue extracted with 500 ml. Skellysolve C. After standing for several days at −25° C., a small amount of a yellow crystalline by-product precipitated and was removed by filtration. The filtrate was concentrated to about 200 ml. by vacuum distillation between 40 and 60° C. Upon standing at −25° C., yellow needles and yellow starlets precipitated and were filtered off. The yellow needles and yellow starlets were separated by hand. The needles (0.8 gram) were recrystallized from Skellysolve C, yielding 0.24 gram of very thin yellow needles which melted at 89–90° C.

|  | Percent C | Percent H | Percent Cl |
|---|---|---|---|
| Calcd. for $C_5H_4N_5Cl$ | 35.41 | 2.37 | 20.91 |
| Found | 35.38 | 2.27 | 21.13 |

EXAMPLE IV

*2-diazomethyl-4-phenyl-6-chloro-1,3,5-triazine*

The amount of 11.3 grams of 2-phenyl-4,6-dichloro-1,3,5-triazine was dissolved in 700 ml. of ether and slowly added with stirring to the solution of 0.25–0.3 mole (approximately 11.5 grams) diazomethane. The temperature was kept at 0° C. The reaction mixture was allowed to stand for about seven days at room temperature and then filtered to remove small amounts of by-products. The ether and the excess diazomethane were removed from the filtrate by vacuum distillation at room temperature. The resulting residue was extracted three times with Skellysolve C. Upon standing at −25° C., 8.85 grams or 76.3% of yellow starlets precipitated which had a melting point of 105–107° C. For final purification the crystals were recrystallized once more from Skellysolve C., M.P. 107–109° C.

|  | Percent C | Percent H | Percent N | Percent Cl |
|---|---|---|---|---|
| Calcd. for $C_{10}H_8N_5Cl$ | 51.85 | 2.61 | 30.24 | 15.37 |
| Found | 52.11 | 2.90 | 29.80 | 15.01 |

EXAMPLE V

*2-diazoethyl-4,6-dichloro-1,3,5-triazine*

The amount of 18.45 grams (1/10 mol) cyanuric chloride dissolved in 350 ml. ether was added upon stirring to the solution of 0.3 mol. diazoethane in 900 ml. ether at 0° C. The reaction mixture was allowed to warm up to room temperature and to stand for 15 hours. After filtration the ether was removed in vacuo and the oily residue was extracted two times with 750 ml. and 500 ml. of boiling Skellysolve C. After standing for one day at −20° C., a yellow oil containing some crystals had separated from the Skellysolve extracts. The oil was separated by decantation and the Skellysolve extract evaporated in vacuo to a small volume. 2.45 grams of 2-diazoethyl-4,6-dichloro-1,3,5-triazine crystallized in orange colored needles, melting at 97.5–100° C. after drying the latter small volume on a porous clay plate. From the aforementioned oil a further crop of 1.1 grams of 2-diazoethyl-4,6-dichloro-1,3,5-triazine was obtained by extraction with Skellysolve C, followed by treatment of this extract as described before. Thus the overall yield is 17.5%. The product can be recrystallized from Skellysolve C yielding yellow needles, M.P. 100–101° C.

|  | Percent C | Percent H | Percent N | Percent Cl |
|---|---|---|---|---|
| Calcd. for $C_5H_3N_5Cl_2$ | 29.43 | 1.48 | 34.33 | 34.76 |
| Found | 29.06 | 1.73 | 33.80 | 35.46 |

EXAMPLE VI

*4,6-dichloro-1,3,5-triazinyl-2-diazoethyl-acetate*

A mixture of 7.53 grams diazoethyl-acetate (0.66 mole) and 1.84 grams cyanuric chloride (0.01 mole) in 40 ml. Skellysolve C were refluxed for nine hours. After distilling off the solvent, the excess diazoethyl-acetate, and the ethyl-chloro-acetate in vacuo, finally at 130°/3.5 mm. a red oil remained which, after standing for about five days at room temperature, partly crystallized. After drying on a porous clay plate, 0.68 gram of yellow needles were obtained which after several recrystallizations from Skellysolve C melted at 53–54° C.

|  | Percent C | Percent H | Percent N | Percent Cl |
|---|---|---|---|---|
| Calcd. for $C_7H_5N_5Cl_2O_2$ | 32.08 | 1.92 | 26.73 | 27.06 |
| Found | 32.29 / 32.32 | 1.94 / 1.98 | 26.53 / 26.43 | 27.00 / 26.89 |

EXAMPLE VII

*2-diazomethyl-4,6-dimethoxy-1,3,5-triazine*

The crude 2-diazomethyl-4,6-dichloro-1,3,5-triazine, 38 grams, of Example I was dissolved in 650 milliliters of methanol. This solution was slowly added, with stirring and at 0° C., to a solution comprising 9.2 grams of sodium and 250 milliliters of methanol.

After standing for 24 hours the reaction mixture was refluxed for 30 minutes. The cooled reaction mixture was then filtered from the sodium chloride and the methanol removed from the filtrate by distillation. At the end of the distillation a slight vacuum was applied. The resulting residue was extracted six times with Skellysolve B. After cooling, 28.3 grams, or 78.4 percent of the theory, of yellow crystals of 2 diazomethyl-4,6-dimethoxy-1,3,5-triazine crystallized. The product was sublimed in vacuo (110 to 135° C. bath temperature, 0.015 mm.) to give yellow prisms which melted at 105 to 106° C.

|  | Percent C | Percent H | Percent N |
|---|---|---|---|
| Calculated for $C_6H_7N_5O_2$ | 39.76 | 3.87 | 38.70 |
| Found | 39.82 | 3.90 | 38.94 |

EXAMPLE VIII

*2-diazomethyl-4,6-diethoxy-1,3,5-triazine*

When the same reaction as described in Example VII was carried out with ethanol instead of methanol, the 2-diazomethyl-4,6-dichloro-1,3,5-triazine was converted, with a yield of 70 percent of the theory, into 2-diazomethyl-4,6-diethoxy-1,3,5-triazine. The latter crystallized from ligroine in yellow prisms, melting at 62.5° C.

|  | C | H | N |
|---|---|---|---|
| Calculated for $C_8H_{11}N_5O_2$ | 45.93 | 5.30 | 33.48 |
| Found | 46.07 | 5.30 | 33.36 |

EXAMPLE IX

2-diazomethyl-4,6-dithiomethyl-1,3,5-triazine 1.15 grams of sodium were dissolved in 50 grams of methanethiol, at a temperature between −20 and 0° C. The excess methanethiol was allowed to evaporate at room temperature, and the solid residue suspended in 100 milliliters of xylene, cooled to 0° C., and 4.75 grams finely powdered 2-diazomethyl-4,6-dichloro-1,3,5-triazine added with stirring. The reaction was allowed to warm up to room temperature, stirred for 10 hours, and finally kept for 30 minutes between 50 and 60° C. All operations were carried out in an atmosphere of pure nitrogen. The reaction mixture was then filtered from insoluble material and the filtrate freed from xylene by vacuum distillation at 50° C. The residue was crystallized from Skellysolve C, yielding 3.75 grams (70 percent of the theory) of 2-diazomethyl-4,6-dithiomethyl-1,3,5-triazine in the form of thin yellow needles. M.P. 112–115° C.

|  | C | H | N | S |
|---|---|---|---|---|
| Calculated for $C_6H_7N_5S_2$ | 33.79 | 3.31 | 32.84 | 30.07 |
| Found | 33.54 | 3.10 | 33.26 | 30.14 |

EXAMPLE X

2-diazomethyl-4,6-dithioethyl-1,3,5-triazine

Working as described in Example IX, 1.15 grams of sodium, 50 grams of ethanethiol and 4.75 grams of 2-diazomethyl-4,6-dichloro-1,3,5-triazine reacted to give 4.6 grams (−75 percent of the theory) of crude 2-diazomethyl-4,6-dithioethyl-1,3,5-triazine as an orange colored oil, solidifying at 0° C. The compound was purified by recrystallization from a low boiling petroleum ether forming yellow spheroidal crystals, melting at 34–35° C.

EXAMPLE XI

2-diazomethyl-4,6-dithiophenyl-1,3,5-triazine 1.15 grams of sodium were dissolved, under reflux in an atmosphere of nitrogen, with stirring in 85 grams of benzenethiol. The excess solvent was removed by vacuum distillation. After cooling, the solid residue was reacted, as described in Example IX, with 4.75 grams of 2-diazomethyl-4,6-dichloro-1,3,5-triazine, yielding 7.0 grams (83 percent of the theory) of crude 2-diazomethyl-4,6-dithiophenyl-1,3,5-triazine. The compound was recrystallized from Skellysolve C, yielding 6.0 grams of yellow needles, melting at 98–99° C.

|  | C | H | N | S |
|---|---|---|---|---|
| Calculated for $C_{16}H_{11}N_5S_2$ | 56.95 | 3.29 | 20.76 | 19.00 |
| Found | 56.86 | 3.48 | 20.73 | 19.01 |

EXAMPLE XII

2-diazomethyl-4-amino-6-chloro-1,3,5-triazine

Ammonia was passed, for two hours, through a refluxing solution of 4 grams of 2-diazomethyl-4,6-dichloro-1,3,5-triazine in 100 milliliters of dry acetonitrile. After cooling to room temperature, the solution was filtered from the ammonium chloride and evaporated in vacuo to dryness. The solid residue (2.4 grams) was extracted with ether and the combined ethereal extracts were washed three times with water and dried over sodium sulfate. After removal of the ether in vacuo there remained 1.7 grams (60.8 percent) of 2-diazomethyl-4-amino-6-chloro-1,3,5-triazine. This was purified by recrystallization from ligroine to give a yellowish, micro-crystalline powder melting at 186° C. (decomposition).

|  | C | H | N | Cl |
|---|---|---|---|---|
| Calculated for $C_4H_3ClN_6$ | 28.17 | 1.75 | 49.29 | 20.79 |
| Found | 28.54 | 1.80 | 49.19 | 20.33 |

EXAMPLE XIII

2-diazomethyl-4,6-diamino-1,3,5-triazine

A mixture of about 70 milliliters of liquid ammonia and 4.75 grams of 2,4-dichloro-6-diazomethyl-1,3,5-triazine was kept at 60° C. for eight hours in an autoclave. After the excess ammonia was allowed to evaporate, the reaction mixture was removed from the autoclave with ice cold concentrated ammonium hydroxide and filtered under vacuum, yielding 3.1 grams (82 percent) of crude 4,6-diamino-2-diazomethyl-1,3,5-triazine. The latter still contained a considerable amount of ammonium chloride, and so was digested several times with aqueous ammonium hydroxide, the resulting paste being dried on a porous plate. To remove the last traces of ammonium chloride, the 4,6-diamino-2-diazomethyl-1,3,5-triazine was heated for about one minute with a mixture of 50 milliliters of ethyl alcohol, 25 milliliters of water, and 3 milliliters of concentrated ammonium hydroxide, and then filtered. The filter cake was extracted with ether and the remaining, slightly colored powder dried over potassium hydroxide. The 2-diazomethyl-4,6-diamino-1,3,5-triazine is practically insoluble in the usual solvents at temperatures which do not cause decomposition of the diazo group. Heated under usual conditions, 4,6-diamino-2-diazomethyl-1,3,5-triazine decomposes gradually above 230° C.

|  | C | H | N |
|---|---|---|---|
| Calculated for $C_4H_5N_7$ | 31.79 | 3.34 | 64.87 |
| Found | 31.82 | 4.18 | 64.10 |

EXAMPLE XIV

2-diazomethyl-4,6-bis-diethylamino-1,3,5-triazine

To 20 grams of diethylamine dissolved in 100 milliliters of ligroine (boiling point 60–70° C.), 4.75 grams of 2-diazomethyl-4,6-dichloro-1,3,5-triazine in 200 milliliters of the same solvent were added at 0° C. The reaction mixture was then refluxed for two hours. The precipitated salts were filtered off and the filtrate was washed several times with water, dried over potassium carbonate, and the solvent removed by distillation. The desired compound remained as a yellow oil in an 83 percent yield. It was purified by vacuum distillation and boiled at 110–115° C./.035 mm.

|  | C | H |
|---|---|---|
| Calculated for $C_{12}H_{21}N_7$ | 54.74 | 8.04 |
| Found | 54.38 | 8.12 |

EXAMPLE XV

2-diazomethyl-4-diethylamino-6-chloro-1,3,5-triazine

The reaction described in Example XIV was carried out with only 4 grams of diethylamine in an ethereal solution at room temperature. Working up after 24 hours resulted in 2-diazomethyl-4-diethylamino-6-chloro-1,3,5-triazine in a yield of 79 percent of the theory. The product was obtained, after recrystallization from ethanol/water, in yellow prisms, melting at 52.5° C.

|  | C | H | Cl | N |
|---|---|---|---|---|
| Calculated for $C_8H_{11}ClN_6$ | 42.39 | 4.89 | 15.64 | 37.08 |
| Found | 42.23 | 4.93 | 14.91 | 37.07 |

EXAMPLE XVI

*2-diazomethyl-4,6-di-aziridino-1,3,5-triazine*

A solution of 5.4 grams of triethylamine and 5.0 grams of ethylene imine in 100 milliliters of anhydrous ether was slowly added at 0° C., with stirring, to a solution of 4.75 grams of 2-diazomethyl-4,6-dichloro-1,3,5-triazine in 200 milliliters of ether. After warming up to room temperature within two hours, the reaction mixture was refluxed for 2½ hours. After standing overnight at room temperature the precipitated triethylamine hydrochloride was filtered off by vacuum and the filtrate evaporated in vacuo to dryness, yielding 3.5 grams of crude 2-diazomethyl-4,6-di-aziridino-1,3,5-triazine. The material was recrystallized from Skellysolve B resulting in a yellow microcrystalline powder, decomposing at 108° C., without melting. Yield: 52 percent of the theory.

|  | C | H |
|---|---|---|
| Calculated for $C_8H_9N_7$ | 47.28 | 4.47 |
| Found | 47.32 | 4.52 |

Examples of other materials useful for the preparation of the novel compounds of this application are:

2-diazomethyl-4,6-diphenoxy-1,3,5-triazine
2-diazomethyl-4,6-bis-ethylamino-1,3,5-triazine
2-diazomethyl-4,6-bis-phenylamino-1,3,5-triazine
2-diazomethyl-4,6-bis-diphenylamino-1,3,5-triazine
2-diazotolyl-4,6-dichloro-1,3,5-triazine
1,6-diazo [2(4,6-dichloro-1,3,5-triazine)]-hexane.

Each of the above compounds can be prepared by first introducing the proper diazo group into the corresponding 2,4-dichloro-6-substituted-1,3,5-triazine. For example, reaction of diazomethane with 2,4-dichloro-6-phenoxy-1,3,5-triazine gives 2-diazomethyl-4-chloro-6-phenoxy-1,3,5-triazine. The chlorine in the 4-position is then replaced with the desired group. Reaction of sodium phenate with 2-diazomethyl-4-chloro-6-phenoxy-1,3,5-triazine gives 2-diazomethyl-4,6-diphenoxy-1,3,5-triazine; reaction of 2-diazomethyl-4-chloro - 6 - ethylamino - 1,3,5-triazine with ethylamine gives 2-diazomethyl-4,6-bis-ethylamino-1,3,5-triazine; reaction of 2-diazomethyl-4-chloro-6-phenylamino-1,3,5-triazine with aniline gives 2-diazomethyl-4,6-bis-phenylamino-1,3,5-triazine; reaction of 2-diazomethyl-4-chloro-6-diphenylamino-1,3,5-triazine with diphenylamine gives 2-diazomethyl-4,6-bis-diphenylamino-1,3,5-triazine. 2-diazotolyl-4,6-dichloro-1,3,5-triazine and 1,6-diazo [2-(4,6-dichloro1,3,5-triazine)]-hexane are prepared by reaction of cyanuric chloride with diazotoluene and 1,6-diazohexane respectively.

The following examples are examples of, and illustrate the preparation of, the compounds of the present invention.

EXAMPLE XVII

*2-dibromomethyl-4,6-dimethoxy-1,3,5-triazine*

To a suspension comprising 18.1 grams of 2-diazomethyl-4,6-dimethoxy-1,3,5-triazine in 250 milliliters of carbon tetrachloride, there was added dropwise with stirring at 0° C., a solution of 16 grams of bromine in 100 milliliters of carbon tetrachloride.

The reaction mixture was allowed to stand for two days at room temperature, after which it was filtered to remove solid by-products. The carbon tetrachloride was then distilled off from the filtrate and the oily residue fractionated in vacuo to give 21.33 grams or 68.2 percent of the theory of the colorless oil, 2-dibromomethyl-4,6-dimethoxy-1,3,5-triazine. The boiling point of the middle fraction was 112 to 118° C. at 0.017 to 0.027 mm. $n_D^{26}=1.5628$.

|  | Percent Br | Percent N |
|---|---|---|
| Calculated for $C_6H_7N_3O_2Br_2$ | 51.12 | 13.42 |
| Found | 51.03 | 13.40 |

Very mild contact with this dibromomethyl derivative has caused swellings and a slight but long lasting anesthesia of the fingers. Small blisters appeared on the affected parts of the hands within a few days. Upon again working with this compound at a later date, the same symptoms on the fingers were observed, and in addition, a strong allergy developed which caused red spots on the skin and itching on nearly the entire body. The allergy disappeared after one injection of calcium gluconate.

EXAMPLE XVIII

*2-dichloromethyl-4,6-dimethoxy-1,3,5-triazine*

A solution comprising 7.1 grams of chlorine and 200 milliliters of carbon tetrachloride was added slowly with stirring to a suspension of 18.1 grams of 2-diazomethyl-4,6-dimethoxy-1,3,5-triazine in 250 milliliters of carbon tetrachloride at 0° C. The latter substance was obtained according to the procedure of Example VIII. The reaction mixture was then allowed to stand for about 20 hours, after which the solid by-product was removed by filtration. The solvent was distilled from the filtrate to leave 7.48 grams or 33.4 percent of the theory of a colorless oil. The 2-dichloromethyl-4,6-dimethoxy-1,3,5-triazine was recovered by fractionation of the oil. It was the fraction boiling at 86.0° to 87.8° C. and at 0.045 millimeter of mercury.

|  | Percent C | Percent H | Percent N | Percent Cl |
|---|---|---|---|---|
| Calcd. for $C_6H_7N_3O_2Cl_2$ | 32.15 | 3.13 | 18.78 | 31.70 |
| Found | 32.32 | 3.26 | 19.10 | 31.25 |

EXAMPLE XIX

*2-dichloromethyl-4,6-dichloro-1,3,5-triazine*

Chlorine was passed through an emulsion of 15 grams of 2-diazomethyl-4,6-dichloro-1,3,5-triazine in 250 milliliters of carbon tetrachloride for 5½ hours at room temperature. The mixture was then refluxed for an additional three hours, filtered, and the carbon tetrachloride removed. The oily residue was distilled in vacuo, yielding 13.25 grams (yield: 72 percent) of 2-dichloromethyl-4,6-dichloro-1,3,5-triazine. The main fraction boiled at 78–82° C./0.05 mm.; $n_D^{25}=1.5550$.

|  | C | H | N | Cl |
|---|---|---|---|---|
| Calculated for $C_4HClN_3$ | 20.63 | 0.43 | 18.04 | 60.90 |
| Found | 20.93 | 0.76 | 17.63 | 60.52 |

EXAMPLE XX

*2-diiodomethyl-4,6-dichloro-1,3,5-triazine*

9.5 grams (½₀ mole) of 2-diazomethyl-4,6-dichloro-1,3,5-triazine was dissolved in 250 milliliters of carbon tetrachloride and a solution of 12.7 grams of (½₀ mole) iodine in 150 milliliters of carbon tetrachloride was added thereto with stirring. The reaction mixture was refluxed for three hours, and after standing for four days at room temperature the carbon tetrachloride was removed in vacuo. The dry residue (18.6 grams, yield 89.4 percent)

was recrystallized three times from Skellysolve C, yielding pink crystals, melting point 93–94° C.

| | Cl | I |
|---|---|---|
| Calculated for C₄H₁N₃Cl₂I₂ | 17.10 | 61.19 |
| Found | 18.40 | 56.48 |

The 2-diiodomethyl-4,6-dichloro-1,3,5-triazine decomposes gradually at room temperature with liberation of iodine.

Examples of other compounds of our invention are:

2-Dibromomethyl-4,6-dichloro-1,3,5-triazine
2-[1',1'-dibromoethyl]-4,6-dichloro-1,3,5-triazine
2-dichloromethyl-4,6-dihydroxy-1,3,5-triazine
2-dichloromethyl-4-methyl-6-chloro-1,3,5-triazine
2-dichloromethyl-4-phenyl-6-chloro-1,3,5-triazine
2-dichloromethyl-4,6-diethoxy-1,3,5-triazine
2-dichloromethyl-4,6-diphenoxy-1,3,5-triazine
2-dichloromethyl-4,6-dithiomethyl-1,3,5-triazine
2-dichloromethyl-4,6-dithiophenyl-1,3,5-triazine
2-dichloromethyl-4,6-diamino-1,3,5-triazine
2-dichloromethyl-4,6-bis-ethylamino-1,3,5-triazine
2-dichloromethyl-4,6-bis-phenylamine-1,3,5-triazine
2-dibromomethyl-4,6-bis-diethylamino-1,3,5-triazine
2-dibromomethyl-4,6-bis-diphenylamino-1,3,5-triazine
2-dichloroethyl-4,6-dichloro-1,3,5-triazine
2-dichlorotolyl-4,6-dichloro-1,3,5-triazine
4,6-dichloro-1,3,5-triazinyl-2-dichloroethylacetate
1,6-bisdichloro-[2(4,6-dichloro-1,3,5-triazine)]-hexane.

We claim:

1. The method of producing 2-dibromomethyl-4,6-dimethoxy-1,3,5-triazine which comprises admixing bromine with 2-diazomethyl-4,6-dimethoxy-1,3,5-triazine at a temperature of about 0° C. to reflux temperature.

2. The method of producing 2-dichloromethyl-4,6-dimethoxy-1,3,5-triazine which comprises admixing chlorine with 2-diazomethyl-4,6-dimethoxy-1,3,5-triazine at a temperature of about 0° C. to reflux temperature.

3. The method of producing 2-dichloromethyl-4,6-dichloro-1,3,5-triazine which comprises admixing chlorine with 2-diazomethyl-4,6-dichloro-1,3,5-triazine at a temperature of about 0° C. to reflux temperature.

4. The method of producing 2-diiodomethyl-4,6-dichloro-1,3,5-triazine which comprises admixing iodine with 2-diazomethyl-4,6-dichloro-1,3,5-triazine at a temperature of about 0° C. to reflux temperature.

5. 2-dibromomethyl-4,6-dimethoxy-1,3,5-triazine.
6. 2-dichloromethyl-4,6-dimethoxy-1,3,5-triazine.
7. 2-dichloromethyl-4,6-dichloro-1,3,5-triazine.
8. 2-diiodomethyl-4,6-dichloro-1,3,5-triazine.

References Cited in the file of this patent

UNITED STATES PATENTS

| 2,394,526 | Thurston | Feb. 5, 1946 |
| 2,463,471 | Thurston | Mar. 1, 1949 |

OTHER REFERENCES

Shapiro et al.: Journ. of the Am. Chem. Soc., vol. 76, pages 97–100 (1954).

Chemical Abstracts, vol. 47, p. 4344 (1953) (abstract of Ettel et al. Chem. Listy vol. 46, p. 289–92 (1952)).